United States Patent
Douet et al.

(10) Patent No.: US 10,097,643 B2
(45) Date of Patent: Oct. 9, 2018

(54) TECHNIQUE FOR REMOTE ADMINISTRATION OF A DEVICE BELONGING TO A PRIVATE NETWORK

(71) Applicant: ORANGE, Paris (FR)

(72) Inventors: Marc Douet, Voreppe (FR); Nordine Oulahal, Grenoble (FR)

(73) Assignee: ORANGE, Paris (FR)

( * ) Notice: Subject to any disclaimer, the term of this patent is extended or adjusted under 35 U.S.C. 154(b) by 224 days.

(21) Appl. No.: 15/025,164

(22) PCT Filed: Sep. 25, 2014

(86) PCT No.: PCT/FR2014/052413
§ 371 (c)(1),
(2) Date: Mar. 25, 2016

(87) PCT Pub. No.: WO2015/044603
PCT Pub. Date: Apr. 2, 2015

(65) Prior Publication Data
US 2016/0269489 A1    Sep. 15, 2016

(30) Foreign Application Priority Data
Sep. 30, 2013   (FR) .................................... 13 59401

(51) Int. Cl.
*G06F 15/173*    (2006.01)
*G06F 15/16*     (2006.01)
(Continued)

(52) U.S. Cl.
CPC ........ *H04L 67/141* (2013.01); *H04L 12/2854* (2013.01); *H04L 41/08* (2013.01); *H04L 41/0886* (2013.01)

(58) Field of Classification Search
CPC ... H04L 67/141; H04L 12/2854; H04L 41/08; H04L 41/0886
(Continued)

(56) References Cited

U.S. PATENT DOCUMENTS 7,599,374 B2 * 10/2009 Poyhonen ......... H04L 29/12537
370/395.2
7,765,294 B2 * 7/2010 Edwards .......... H04L 29/06027
370/230
(Continued)

OTHER PUBLICATIONS

English Translation of the International Written Opinion dated Nov. 25, 2016 for International Application No. PCT/FR2014/052413, filed Sep. 25, 2014.
(Continued)

*Primary Examiner* — Melvin H Pollack
(74) *Attorney, Agent, or Firm* — David D. Brush; Westman, Champlin & Koehler, PA

(57) ABSTRACT

A technique is provided for remote administration, by an administration apparatus, of a device belonging to a private communication network. The device sends administration data to the administration apparatus via an access network. The administration data includes a first item of connection data and a contact number associated with the device in a signalling network. In order to administer the device, the administration apparatus sends a connection request to the device via the signalling network by using the received contact number. This connection request triggers the establishment of a session by the device with the administration apparatus via the access network.

7 Claims, 2 Drawing Sheets

(51) Int. Cl.
*H04L 29/08* (2006.01)
*H04L 12/24* (2006.01)
*H04L 12/28* (2006.01)

(58) Field of Classification Search
USPC .......................................................... 709/223
See application file for complete search history.

(56) References Cited

U.S. PATENT DOCUMENTS

| | | | | |
|---|---|---|---|---|
| 8,615,072 | B2* | 12/2013 | Mahalingam | H04M 3/42382 379/102.01 |
| 8,730,929 | B2* | 5/2014 | Tao | H04L 12/12 370/338 |
| 8,819,233 | B2* | 8/2014 | Hershko | H04L 61/157 709/217 |
| 8,874,741 | B2* | 10/2014 | Hassan | H04L 12/2834 709/223 |
| 8,924,556 | B2* | 12/2014 | Hershko | H04L 61/106 455/406 |
| 8,996,659 | B2* | 3/2015 | Werth | H04L 67/34 709/218 |
| 9,021,073 | B2* | 4/2015 | Shaikh | H04L 29/12188 709/222 |
| 9,172,582 | B2* | 10/2015 | Santos | H04W 76/02 |
| 9,191,796 | B2* | 11/2015 | Cook | H04W 4/16 |
| 9,319,467 | B2* | 4/2016 | Abuan | H04L 9/32 |
| 9,497,168 | B2* | 11/2016 | Dingman | H04L 29/06027 |
| 9,589,029 | B2* | 3/2017 | Choudhary | G06F 17/30545 |
| 9,609,003 | B1* | 3/2017 | Chmielewski | G06F 3/041 |
| 9,647,978 | B2* | 5/2017 | Kirchhoff | H04L 51/36 |
| 9,660,917 | B2* | 5/2017 | McNaughton | H04L 47/125 |
| 9,699,646 | B2* | 7/2017 | Poon | H04W 8/22 |
| 9,806,972 | B2* | 10/2017 | Edwards | H04L 43/0852 |
| 9,832,090 | B2* | 11/2017 | Bugenhagen | H04L 43/0829 |
| 2008/0049639 | A1* | 2/2008 | Wiley | H04L 41/18 370/252 |
| 2010/0272057 | A1 | 10/2010 | Chen | |
| 2012/0122422 | A1 | 5/2012 | Olsson et al. | |
| 2012/0282900 | A1 | 11/2012 | Zhang et al. | |
| 2014/0237131 | A1* | 8/2014 | Chan | H04L 67/10 709/228 |
| 2014/0289826 | A1* | 9/2014 | Croome | H04L 67/141 726/5 |
| 2017/0078922 | A1* | 3/2017 | Raleigh | H04W 28/10 |
| 2017/0099260 | A1* | 4/2017 | Cohn | H04L 63/0272 |
| 2017/0124559 | A1* | 5/2017 | Kuhn | G06Q 20/3829 |
| 2017/0201589 | A1* | 7/2017 | Fiala | H04L 67/141 |
| 2017/0279971 | A1* | 9/2017 | Raleigh | H04L 12/14 |
| 2017/0302447 | A1* | 10/2017 | Nix | H04W 52/0235 |

OTHER PUBLICATIONS

International Search Report and English translation dated Nov. 25, 2016 for International Application No. PCT/FR2014/052413, filed Sep. 25, 2014.
Written Opinion dated Nov. 25, 2016 for International Application No. PCT/FR2014/052413, filed Sep. 25, 2014.

* cited by examiner

TECHNIQUE FOR REMOTE ADMINISTRATION OF A DEVICE BELONGING TO A PRIVATE NETWORK

CROSS-REFERENCE TO RELATED APPLICATIONS

This Application is a Section 371 National Stage Application of International Application No. PCT/FR2014/052413, filed Sep. 25, 2014, the content of which is incorporated herein by reference in its entirety, and published as WO 2015/044603 on Apr. 2, 2015, not in English.

FIELD OF THE DISCLOSURE

The invention relates to the general field of telecommunications.

The invention relates more particularly to the remote administration and maintenance of devices of a private communication network from an administration apparatus.

This may be, for example, equipment or devices located at a client site, also known as CPE, for 'Customer Premises Equipment', and connected to a wide area network, such as the Internet network, via an access gateway. For a local area network, this means notably the access gateway, a TV decoder ('Set-Up Box'), or a mobile terminal. In the context of a home automation network, this also refers to domestic appliances, alarm systems, and sensors.

BACKGROUND OF THE DISCLOSURE

In order to ensure quality services, it is preferable for an operator of the wide area network to be able to remotely manage such devices.

The remote management of devices notably requires:
- detecting and knowing the devices present on the local area network, e.g. their serial numbers, and their hardware and software versions;
- monitoring these devices, e.g. by obtaining monitoring information and performance indicators.

The remote management of devices on a local area network is based on a technical report prepared by the Broadband Forum, TR-069 'CPE WAN Management Protocol'. This technical report defines a CWMP protocol, for communication between a remote 'Auto-Configuration Server' (ACS) and a device on the local area network. The CWMP protocol defines a mechanism that notably enables a secure auto-configuration of local area network equipment and other functions for managing these devices.

It is notably possible for the network operator to perform remote interventions, such as:
- updating the software or firmware of a device, when a software or firmware upgrade is required;
- performing a diagnostic when a device is malfunctioning;
- dynamically installing and configuring new services;
- monitoring the status and performance of a device.

The CWMP protocol provides that the local area network device establishes a connection under certain conditions with the ACS auto-configuration server and an 'Inform RPC' procedure is executed. During this procedure, the local area network device transmits administration data, in particular a universal address or URL (for 'Uniform Resource Locator') in the wide area network, denoted by Connection-RequestURL. Indeed, the CWMP protocol provides that establishing a session is always initiated by the local area network device. The ACS auto-configuration server can trigger this establishment of a session by requesting a device on the local area network to initiate it. For this purpose, the ACS auto-configuration server transmits a GET request according to the HTTP (Hyper Text Transfer Protocol) protocol to the universal address ConnectionRequestURL. On receiving this request and when it is valid, the local area network device establishes a session with the ACS auto-configuration server by introducing itself with a '6 CONNECTION REQUEST' event.

Moreover it is now possible to access the Internet network through a third generation 3G or fourth-generation 4G or LTE for 'Long Term Evolution' mobile access network in conditions close to what it is possible to obtain via a fixed ADSL or Fiber type access network. The private network may, in particular, be a mobile access network for which an LTE gateway provides access to the Internet network. It is also possible to apply the mechanisms defined in the technical report TR-069 for remotely managing these LTE gateways. However, it is often found that mobile network operators do not assign a public address to mobile devices or terminals connected to the mobile network. The mobile device during the Inform RPC procedure will provide a private address as the universal address ConnectionRequestURL. Then it is not possible to trigger an establishment of a session for such a mobile device.

There are methods for transmitting the connection request when the device to be administered is located in a private network, such as the traversal of address translation equipment STUN (for 'Simple Traversal of UDP through NATs') defined by the IETF document RFC 3489 or the use of a UPnP-IGD (for 'Universal Plug and Play Internet Gateway Device') protocol. However, these methods are complex to implement and require updates of both gateways and devices on the local area network.

SUMMARY

According to a first aspect, the subject matter of the invention is a method for remote administration by an administration apparatus of a device belonging to a private communication network, in which the following steps are implemented by the administration apparatus:
- receiving administration data from the device via an access network, said administration data including a first item of connection data;
- sending to the device a connection request, said connection request triggering an establishment of a session by the device with the administration apparatus via the access network, characterized in that, a contact number being associated with the device in a signaling network, the received administration data further include said contact number of the device as a second item of connection data and in that the connection request is transmitted to the device via the signaling network by means of the received contact number.

Correspondingly, according to a second aspect, the subject matter of the invention is a method for establishing a session by a device belonging to a private communication network with an administration apparatus for a remote administration of said device, said method including the following steps implemented by the device:
- sending administration data to the administration apparatus via an access network, said administration data including a first item of connection data;
- receiving from the administration apparatus a connection request, said connection request triggering the establishment of the session via the access network, characterized in that, a contact number being associated with the device in a signaling network, the sent administration data further include said contact number as a second item of connection data and in that the connection request is received by the device via the signaling network by means of said sent contact number.

The device on the private communication network provides the administration apparatus with another means for triggering an establishment of a session initiated by the device, in addition to sending a connection request to a universal address. This other means corresponds to sending a connection request to a contact number via a signaling network, separate from the access network. Thus, it is possible to trigger an establishment of a session via the access network for the devices on the private network having such a contact number in a simple manner.

The invention originates from a drawback found for devices on a private network not having a public universal address. However, the administration and session establishment methods may be implemented for all the devices on the private network, having this other means available.

This other means is, for example, activated systematically, in the absence of a response to a connection request transmitted to the universal address via the access network or when the device is not reachable at the universal address via the access network. It is thus possible to improve the trigger mechanism for establishing a session.

Moreover, no modification is necessary at the level of an access gateway to the private network. Only the device and administration apparatus software have to be modified. It is thus particularly simple to implement the methods previously described.

The various embodiments or features mentioned below may be added independently or in combination with each other, to the steps of the administration method as previously defined.

In one particular embodiment of the administration method, the first item of connection data being an address to be used for transmitting a connection request, the transmission of the connection request by means of the received contact number is performed when said address to be used is a private address in the private network.

This other means is activated when the first item of connection data corresponds to a private address in the private network. A connection request transmitted to this private address is not routable by the different networks.

In one particular embodiment of the administration method, an item of identification data is associated with the connection request, said item of identification data enabling the device to check that the connection request has been sent by the administration apparatus.

Correspondingly, in one particular embodiment of the session establishment method, prior to the establishment of the session, the device, with the aid of an item of identification information associated with the connection request, checks that the received connection request has been sent by the administration apparatus.

Identifying the origin of the connection request helps to increase security during the implementation of the administration and session establishment methods.

According to a third aspect, the invention also concerns an apparatus for remote administration of a device belonging to a private communication network, said apparatus including:
a module for receiving administration data from a device via an access network, said administration data including a first item of connection data;
a module for sending a connection request to the device, said connection request triggering an establishment of a session by the device with the administration apparatus via the access network, characterized in that, a contact number being associated with the device in a signaling network, the received administration data further include said contact number of the device as a second item of connection data and in that the connection request is transmitted to the device via the signaling network by means of the received contact number.

The advantages described for the administration method according to the first aspect are directly transposable to the administration apparatus.

According to a fourth aspect, the invention also concerns a device belonging to a private communication network, arranged for being remotely administered by an administration apparatus, said device including:
a module for sending administration data to the administration apparatus via an access network, said administration data including a first item of connection data;
a module for receiving from the administration apparatus a connection request, said connection request triggering the establishment of the session via the access network, characterized in that, a contact number being associated with the device in a signaling network, the sent administration data further include said contact number as a second item of connection data and in that the connection request is received by the device via the signaling network by means of said sent contact number.

The advantages described for the session establishment method according to the second aspect are directly transposable to the device to be administered.

According to a fifth aspect, the invention concerns a program for an administration apparatus, including program code instructions intended to control the execution of the steps of the administration method previously described, when this program is executed by this administration apparatus and a recording medium readable by an administration apparatus on which a program for an apparatus is recorded.

The advantages described for the administration method according to the first aspect are directly transposable to the program for an administration apparatus and to the recording medium.

According to a sixth aspect, the invention concerns a program for a device to be administered, including program code instructions intended to control the execution of the steps of the session establishment method previously described, when this program is executed by this device and a recording medium readable by a device to be administered on which a program for a device is recorded.

The advantages described for the session establishment method according to the second aspect are directly transposable to the program for a device to be administered and to the recording medium.

BRIEF DESCRIPTION OF THE DRAWINGS

The invention will be better understood with the aid of the following description of particular embodiments of the technique for remote administration of a device, with reference to the accompanying drawings in which.

DETAILED DESCRIPTION OF ILLUSTRATIVE EMBODIMENTS

Figure 1:
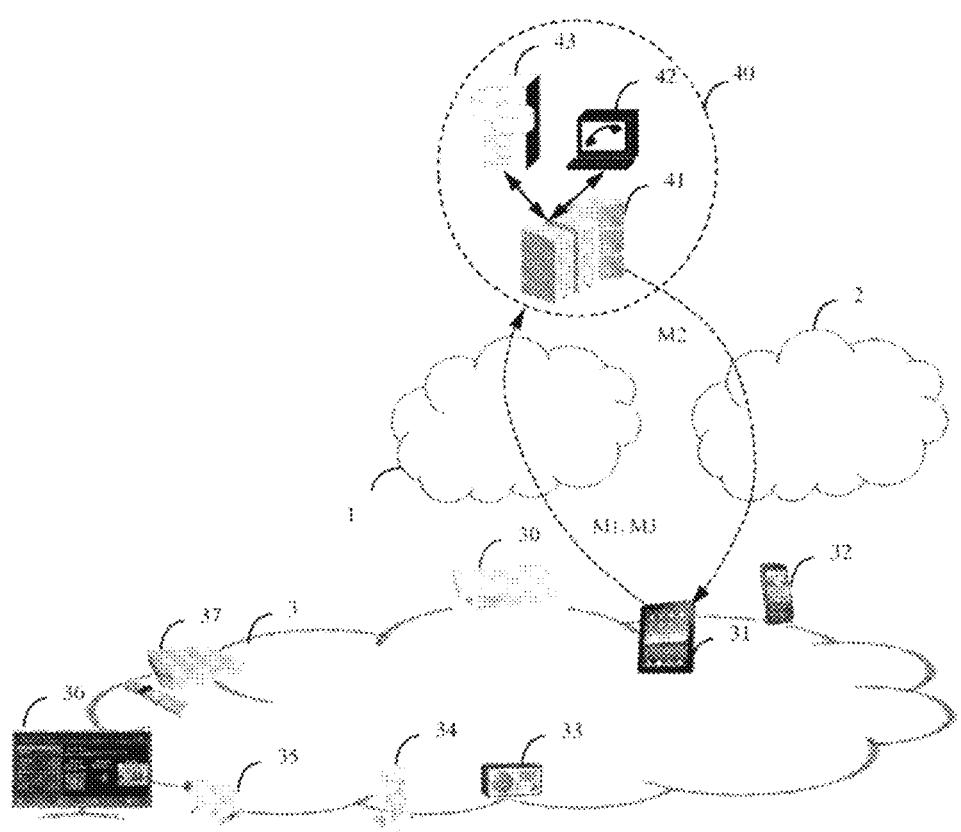
FIG. 1 represents a remote administration system in a communication network.

FIG. 1 represents, in its environment, a private or local communication network 3 remotely administered by an administration system 40. The IP (for 'Internet Protocol') protocol is used by the devices in the private network for communicating with each other and also for communicating with a Wide Area Network or WAN, such as the Internet network.

For the environment represented in FIG. 1, local communication network 3 is understood to mean a LAN ('Local Access Network') type network. This network may be in particular a home network or a corporate network. An access gateway 30 is arranged for providing devices on the local area network 3 with access to the wide area network (e.g. the Internet) via an access network 1. The access network 1 is, for example, an xDSL (for 'Digital Subscriber Line', the x indicating that this may be an ADSL, HDSL, VDSL, . . . , network) access network. It may also be an FTTH (for 'Fiber To The Home') network. There is no restriction on the type of access network 1.

The local area network 3 may be either an Ethernet wired network, according to the IEEE 802.3 standard, a Wi-Fi wireless network, according to the IEEE 802.11 standard or a Power Line Carrier (PLC) network.

The devices 31-37 on the local area network 3 may be any devices, e.g. domestic, featuring a wired or wireless network connection. As illustrative examples, various devices are represented in FIG. 1. It may involve, for example, a computer, a touch tablet 31, a mobile phone 32, a connected radio set 33, a fixed telephone 34, a projector 35, a television 36, a TV decoder 37 ('Set-Top Box'), a games console, household appliances, etc.

The devices 31-37 on the local area network 3 have a 'private' address on the local area network 3. The gateway 30 is then arranged for implementing a private-to-public address translation and vice versa.

The administration system 40 includes a plurality of equipment enabling the communication network operator to administer and monitor devices, notably devices belonging to local area networks. The administration system 40 notably includes an administration apparatus 41 also called an 'Auto-Configuration Server' (ACS), a call center 42 and 'Operational Support System' (OSS) or 'Business Support System' (BSS) support centers 43.

In the embodiment described, the administration of the devices 31-37 and the gateway 30 of the local area network 3 is performed remotely by the administration apparatus 41 located outside the local area network 3 and communicating with the devices on the local area network 3 via the access network 1 and the gateway 30. The administration apparatus enters into dialog with the devices 30-37 on the local area network 3 with a view to administering them according to the remote management protocol CWMP ('CPE WAN Management Protocol') defined in Technical Report TR-069 drawn up by the Broadband Forum.

Under the CWMP protocol, the administration apparatus 41 may notably:

obtain and remotely manage a status on the local area network 3, of the devices 30-37 that are connected thereto;

initiate diagnostic tests;

download/upload software or firmware files and manage events.

The remote administration application uses the CWMP protocol and is based on TCP/IP, SSL/TLS, HTTP, SOAP, and RPC Methods protocol layers.

Technical Report TR-069 provides that a device 30-37 on the local area network 3 establishes a connection under certain conditions with the administration apparatus 41 and an 'Inform RPC' procedure is executed. During this procedure, the device 30-37 on the local area network 3 transmits various administration data relating thereto via the access network 1. The administration data received during this 'Inform RPC procedure' are stored in a database (not represented in FIG. 1) and then enable the administration apparatus 41 to perform various device management tasks via the access network 1. The administration data include in particular an item of connection data. This item of connection data corresponds to a universal address or URL denoted by ConnectionRequestURL. This universal address is provided for enabling the administration apparatus 41 to transmit to the local area network device a connection request to this address under the HTTP protocol. This connection request is used to trigger an establishment of a session by the device to be administered with the administration apparatus via the access network 1.

It is emphasized here that in the particular case of devices 31-37 on the local area network 3, the item of connection data, i.e. the universal address ConnectionRequestURL, corresponds to a private IP address allocated to the device on the local area network 3.

Some of the local area network devices 3 are also arranged for communicating directly with the Internet communication network via a second access network 2, distinct from the access network 1, via which the administration apparatus and the devices to be administered communicate. 'Directly' is understood to mean that neither the gateway 30 nor the access network 1 is involved in these exchanges. The second access network 2 is, for example, a 3GPP third or fourth generation mobile network. For this purpose, these devices on the local area network 3 notably include a USIM ('Universal Subscriber Identity Module'). subscriber identification card. This subscriber identification card is associated with an MSISDN (for 'Mobile Subscriber Integrated Services Digital Network Number') subscriber number. This subscriber number is henceforth referred to as the contact number. As an illustrative example, the tablet 31 and the mobile terminal 32, having a direct means of communication with the Internet communication network, correspond to this type of device. It is thus possible to directly contact the device associated with this contact number via the second access network 2. In one particular embodiment, the gateway 30 is also provided with a subscriber identification card.

Hereafter, in the context of implementing the administration method, the second access network 2 is used only for transmitting a signaling message to a device on the local area network by means of a signaling channel. It is thus termed a signaling network.

In the embodiment described, the administration apparatus 41 is also arranged for triggering the transmission via the signaling network of a signaling message carrying a connection request. The administration apparatus 41 may itself have an embedded SIM-type subscriber identification card. In another embodiment, the administration apparatus 41 interfaces with another apparatus, arranged for transmitting the signaling message on the signaling network.

A description will now be given of the technique of administration in one particular embodiment, as it is implemented by the administration apparatus and a device on the local area network in the environment of FIG. 1, in relation to FIG. 2.

Figure 2:
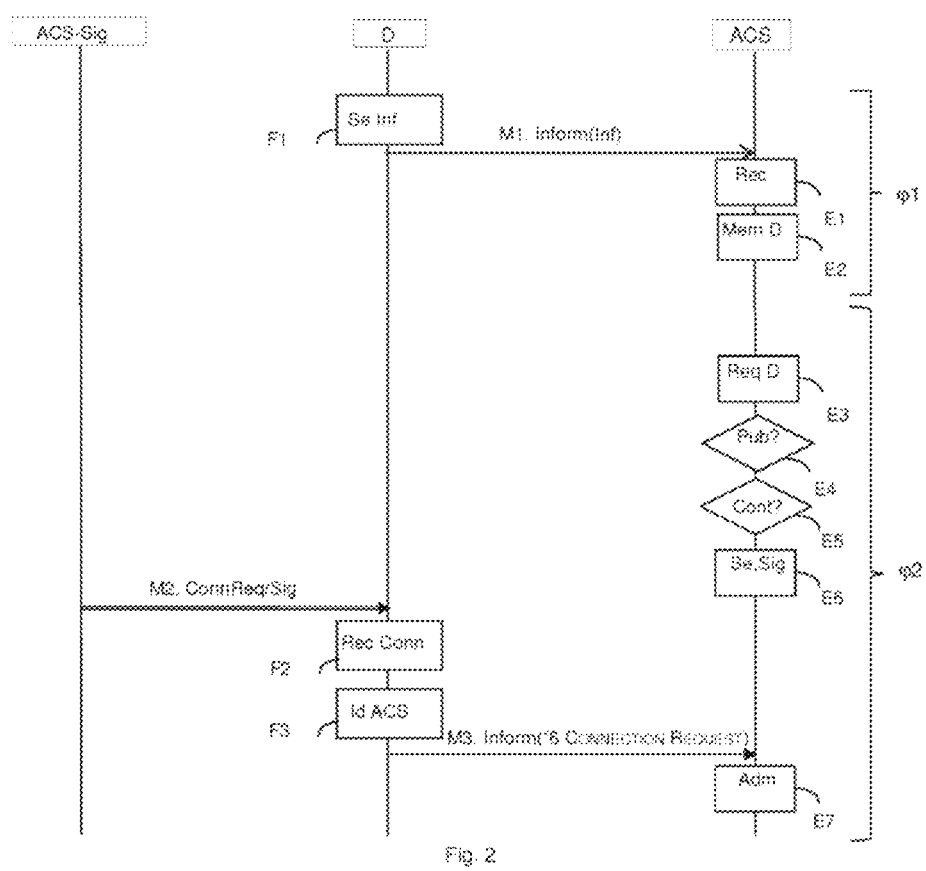
FIG. 2 illustrates steps of the administration and session establishment methods according to one particular embodiment.

The first phase φ1 represented in FIG. 2 represents steps of the administration method implemented by the configuration apparatus 41 and steps of the session establishment method implemented by a device 31 on the local area network 3. This phase corresponds to a phase of recording the device in the database of the administration apparatus 41 when executing an 'Inform RPC' procedure via the access network 1. Hereafter the case is considered where the device executing the steps of this recording phase is provided with a SIM card and has a contact number for reaching it via the second access network 2.

In a step F1 of the session establishment method, the device 31, 32 of the local area network 3 transmits via the access network 1 to the administration apparatus 41 administration data relating thereto, including connection data. A first item of connection data corresponds to the Connection-Request universal address. A second item of connection data corresponds to the contact number of the device in the signaling network 2. This transmission is represented in a simplified manner in FIGS. 1 and 2 in the form of a message M1 transmitted from the device to the administration apparatus 41. Here, it is emphasized that this transmission corresponds to a plurality of exchanges between the device on the local area network and the administration apparatus 41 in accordance with Technical Report TR-069. The second item of connection data, i.e. the contact number in the signaling network is, for example, transmitted in the object 'InternetGatewayDevice.ManagementServer', this object including the parameters relating to the association of the device on the local area network with the administration apparatus 41.

The administration data concerning the device are received by the administration apparatus 41 in a step E1 of the administration method and stored in a step E2 of this method in the database of the administration apparatus 41 in association with an identifier of the device concerned. The administration apparatus 41 thus also stores the contact number in the signaling network in the database.

The phase of recording the device 31, 32 in the database of the administration apparatus 41 is completed. With each modification of an item of administration data, this phase is again executed initiated by the device on the local area network 3.

The second phase φ2 represented in FIG. 2 represents steps of the administration method implemented by the configuration apparatus 41 and steps of the session establishment method implemented by the device 31 on the local area network 3. This phase corresponds to a phase of establishing a session between the configuration apparatus 41 and the device on the local area network, initiated by the device on the local area network. It is triggered by the administration apparatus when an administration operation must be performed for the device on the local area network, the 'device to be administered'.

It is recalled here that the CWMP protocol provides that establishing a session is initiated by the local area network device. The administration apparatus may trigger this session establishment by requesting it from the device on the local area network, by transmitting a connection request.

In a step E3 of the administration method, the administration apparatus 41 determines that establishing a session with the device 31 is required and obtains the connection data concerning the device to be contacted from the database.

In a step E4 of the administration method, the administration apparatus 41 checks that the universal address is a public address, i.e. a single, routable address from the Internet network.

If such is the case, the administration apparatus 41 transmits to the device to be contacted via the access network 1 a GET request according to the HTTP (for 'Hyper Text Transfer Protocol') protocol at the universal address ConnectionRequestURL, in accordance with what is described in Technical Report TR-069.

If the universal address provided by the device to be administered is a private address, the administration apparatus 41 checks whether a contact number in the signaling network 2 is associated with the device 31 in a step E5 of the administration method.

If no contact number is associated with the device, the second phase ends without establishing a session with the device to be administered.

If a contact number is associated with the device 31 to be administered, in a step E6 of the administration method, the administration apparatus 41 triggers sending a signaling message carrying a connection request to the contact number of the device 31 in the signaling network 2. The signaling message may be a short message or SMS (for 'Short Message Service') message, an item of USSD (for 'Unstructured Supplementary Service Data') data, or a short multimedia or MMS (for 'Multimedia Message Service') message. This sending of the signaling message is represented in FIGS. 1 and 2 in the form of a message M2 transmitted from a signaling module associated with the administration apparatus 41.

This connection request message is received in a step F2 of the session establishment method by the device 31.

In a step F3 of the establishment method, the device 31 identifies that the connection request actually originates from the administration apparatus 41. More precisely, the device 31 checks an item of identification data associated with the signaling message received.

In one particular embodiment, the item of identification data is the contact number associated with the administration apparatus 41.

In another embodiment, the item of identification data is an item of information contained in the signaling message. The administration apparatus 41 may thus include an IMSI (for 'International Mobile Subscriber Number') international subscriber number, an identifier or alias, a password or any other information enabling the device to identify the origin of the connection request.

When the connection request does originate from the administration apparatus 41, the device 31 processes this connection request as if it were a connection request compliant with the HTTP protocol that would have been received at the universal address ConnectionRequestURL via the access network 1. The device 31 triggers the wake-up of the TR-069 communication layer and then establishes a session with the administration apparatus 41 via the access network 1 by introducing itself with a '6 CONNECTION REQUEST' event, Inform ('6 CONNECTION REQUEST'). This session establishment is represented in FIGS. 1 and 2 in the form of a message M3 transmitted from the device to be administered to the administration apparatus 41. Thus it can be seen that in the embodiment described, a connection request is transmitted to the device to be administered by means of a different protocol from the HTTP protocol and via a different network medium, i.e. the signaling network 2 instead of the access network 1.

In a step E7 of the administration method, the administration apparatus 41 receives this message Inform ('6 CONNECTION REQUEST') and then implements the required administration operation.

This enables a session to be established by a device even when it does not have a public address. The problems associated with the presence of an address translation device are thus simply resolved, without requiring the implementation of complex mechanisms in the device on the local area network.

The methods have been described for a device on the local area network. In one particular embodiment, the gateway is provided with a SIM card and may then be considered as a device on the local area network.

The administration method has been described in one particular embodiment where the contact number is used when the universal address is a public address. In other embodiments, step E4 of the administration method is not implemented.

In a first embodiment, the universal address is systematically used for sending a connection request via the access network 1. The establishment of a session by the device in response to this connection request, is monitored by a timeout. When this timeout expires, the administration apparatus 41 then initiates steps E5 and E6 previously described, in order to send a connection request by means of the contact number via the signaling network.

In a second embodiment, once a contact number has been provided by the device during the recording phase, it is used for sending a connection request via the signaling network.

The administration and session establishment methods have been described for a device on the local area network, having a first means of communication via a fixed access gateway and a means of communication with a mobile network.

It is recalled here that in one of the embodiments previously described, the access gateway allows access to the fixed access network and access to the mobile access network.

The following non-exhaustive examples illustrate the implementation of the methods previously described in other environments.

The particular case is considered where the gateway is a 3G or 4G mobile access gateway. Such a gateway offers access to the Internet network to mobile devices that are located within the area of radio coverage thereof. Mobile devices accessing the communication network via this mobile access gateway do not have a public address. When the user of the mobile device wishes to trigger an update, for example, of its software, it is necessary with the mechanisms currently provided in Technical Report TR-069 to wait for the mobile device to introduce itself spontaneously, during a reboot or periodically, to the administration apparatus so that this update can take place. By contacting the mobile device by means of its contact number, it is then possible to perform this update immediately. The mobile access gateway itself may also not have a public address. It is then possible to contact it by means of its own contact number.

In another example, the device to be administered is also arranged for being connected to the Internet network via the access network 2, e.g. a mobile network. In the event of a malfunction of the access to the Internet network via the fixed access network, the session establishment is performed via the mobile access network and the user of the device then benefits from the administration functionalities and notably those diagnostic ones for restoring the configuration of access to the Internet network via the fixed access network.

Figures 3, 4:
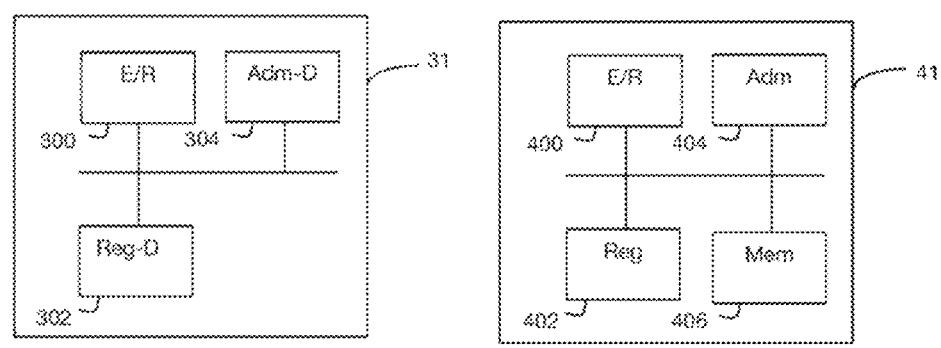
FIG. 3 represents a device to be administered according to one particular embodiment.
FIG. 4 represents an administration apparatus according to one particular embodiment.

A description will now be given of a device 31 belonging to a private communication network in one particular embodiment of the invention with reference to FIG. 3. Such a device is arranged for being remotely administered by an administration apparatus 41 and notably includes:

a communication module 300, arranged for communicating with the administration apparatus;

a sending module 302, arranged for sending administration data to the administration apparatus via an access network, said administration data including a first item of connection data;

a receiving module 304, arranged for receiving from the administration apparatus a connection request, said connection request triggering the establishment of the session via the access network.

The device 31 is also arranged for accommodating a USIM subscriber identity card, associated with a contact number in a signaling network, and for communicating data via the signaling network.

The sending module 302 is further arranged for sending in the administration data the contact number associated with the device as a second item of connection data.

The receiving module 304 is arranged for receiving a connection request by means of the first item of connection data and for establishing a session with the administration apparatus 41 via the access network. It is also arranged for receiving a connection request by means of the contact number in the signaling network and for waking up the TR-069 communication layer for establishing the session with the administration apparatus 41 via the access network.

In one particular embodiment, the receiving module 304 is further arranged for receiving an item of identification data associated with the connection request and for checking from this item of identification data that the connection request has been sent by the administration apparatus.

A description will now be given of an administration apparatus 41 in one particular embodiment of the invention with reference to FIG. 4. Such an administration apparatus notably includes:

a communication module 400, arranged for communicating with devices to be administered;

a receiving module 402, arranged for receiving administration data from a device via an access network, said administration data including a first item of connection data;

a sending module 404, arranged for sending a connection request to a device to be administered, said connection request triggering an establishment of a session by the device with the administration apparatus via the access network;

a memory area 406, arranged for storing in the form of a database administration data received in association with an identifier of the device concerned.

The receiving module 402 is further arranged for receiving in the administration data a contact number associated with the device in a signaling network as a second item of connection data and for storing it in the memory area 406 with the other administration data received.

The sending module 404 is then arranged for transmitting the connection request to the device to be administered via the signaling network by means of the received contact number.

In one particular embodiment, the sending module 404 is further arranged for checking that the first item of connection data is a private address before sending the connection request to the contact number. When the first item of connection data is a public address, the sending module 404 is arranged for transmitting the connection request to the first item of connection data via the access network.

In one particular embodiment, the sending module 404 is further arranged for associating an item of identification data with the connection request, this item of identification data enabling the device to check that the connection request has been sent by the administration apparatus.

The invention is implemented by means of software and/or hardware components. In this context, the term 'module' may correspond in this document both to a software component and to a hardware component or to an assembly of hardware and/or software components, capable of implementing a function or a set of functions, according to what has been previously described for the module concerned.

A software component is one or more computer programs, one or more subprograms of a program, or more generally any program or software element. Such a software component is stored in memory then loaded and executed by a data processor of a physical entity and is capable of accessing the hardware resources of this physical entity (memories, recording media, communication bus, input/output printed circuit boards, user interfaces, etc.).

Similarly, a hardware component is any element of a hardware assembly. This may be a programmable or non-programmable hardware component, with or without an integrated processor for executing software. It may be, for example, an integrated circuit, a smart card, a printed circuit board for executing firmware, etc.

In one particular embodiment, the modules 302, 304 are arranged for implementing the session establishment method previously described. They are preferably software modules including software instructions for executing the steps of the session establishment method previously described, implemented by a device on a private network. The invention therefore also concerns:
a program for a device, including program code instructions intended to control the execution of the steps of the session establishment method previously described, when said program is executed by said device;
a recording medium readable by a device on which the program for a device is recorded.

In one particular embodiment, the modules 402, 404 are arranged for implementing the administration method previously described. They are preferably software modules including software instructions for executing the steps of the administration method previously described, implemented by an administration apparatus. The invention therefore also concerns:
a program for an administration apparatus, including program code instructions intended to control the execution of the steps of the administration method previously described, when said program is executed by said administration apparatus;
a recording medium readable by an administration apparatus on which the program for an apparatus is recorded.

The software modules may be stored in or transmitted by a data medium. This may be a hardware storage medium, e.g. a CD-ROM, a magnetic disk or a hard disk, or a transmission medium such as an electrical, optical or radio signal, or a telecommunication network.

An exemplary embodiment of the present disclosure overcomes the shortcomings/drawbacks of the prior art and/or makes improvements thereto.

Although the present disclosure has been described with reference to one or more examples, workers skilled in the art will recognize that changes may be made in form and detail without departing from the scope of the disclosure and/or the appended claims.

The invention claimed is:

1. A method comprising:
remotely administering, by an administration apparatus, a device belonging to a private communication network, in which the following acts are implemented by the administration apparatus:
receiving administration data from the device via an access network, said administration data including a first item of connection data and a second item of connection data, the first item of connection data being an address to be used for transmitting a connection request via the access network, and the second item of connection data comprising a contact number associated with the device in a signaling network; and
sending to the device the connection request via the signaling network using the received contact number, said connection request triggering an establishment of a session by the device with the administration apparatus via the access network.

2. The remote administration method as claimed in claim 1, wherein the transmission of the connection request by using the received contact number is performed when said address to be used is a private address in the private network.

3. The remote administration method as claimed in claim 1, in which an item of identification data is associated with the connection request, said item of identification data enabling the device to check that the connection request has been sent by the administration apparatus.

4. A method comprising:
establishing a session by a device belonging to a private communication network with an administration apparatus for a remote administration of said device, wherein establishing a session comprises the following acts implemented by the device:
sending administration data to the administration apparatus via an access network, said administration data including a first item of connection data and a second item of connection data, the first item of connection data being an address to be used for transmitting a connection request via the access network, and the second item of connection data comprising a contact number associated with the device in a signaling network; and
receiving from the administration apparatus the connection request via the signaling network using the sent contact number, said connection request triggering the establishment of the session via the access network.

5. The establishment method as claimed in claim 4, in which, prior to the establishment of the session, the device, with the aid of an item of identification information associated with the connection request, checks that the received connection request has been sent by the administration apparatus.

6. An apparatus for remote administration of a device belonging to a private communication network, said apparatus including:
a module configured to receive administration data from a device via an access network, said administration data including a first item of connection data and a second item of connection data, the first item of connection data being an address to be used for transmitting a connection request via the access network, and the second item of connection data comprising a contact number associated with the device in a signaling network; and a module configured to send the connection request to the device via the signaling network using the received contact number, said connection request triggering an establishment of a session by the device with the administration apparatus via the access network.

7. A device belonging to a private communication network, arranged for being remotely administered by an administration apparatus, said device including:

a module configured to send administration data to the administration apparatus via an access network, said administration data including a first item of connection data and a second item of connection data, the first item of connection data being an address to be used for transmitting a connection request via the access network, and the second item of connection data comprising a contact number associated with the device in a signaling network; and a module configured to receive from the administration apparatus the connection request via the signaling network using the sent contact number, said connection request triggering the establishment of the session via the access network.

* * * * *